(12) United States Patent
Baba

(10) Patent No.: US 6,498,837 B1
(45) Date of Patent: Dec. 24, 2002

(54) METHOD AND APPARATUS CAPABLE OF PERFORMING INFORMATION PROVIDING OPERATION WITH INFORMATION SECURITY MEASURES

(75) Inventor: Keizo Baba, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/358,971

(22) Filed: Jul. 16, 1999

(30) Foreign Application Priority Data

Jul. 21, 1998 (JP) .......................................... 10-204605

(51) Int. Cl.$^7$ .............................................. H04M 11/00
(52) U.S. Cl. ............................ 379/100.08; 379/100.01; 379/93.02; 358/434
(58) Field of Search ...................... 379/100.01, 100.08, 379/100.09, 100.12, 93.17, 93.22, 93.37, 93.02; 358/400, 402, 403, 407, 434–442, 468

(56) References Cited

U.S. PATENT DOCUMENTS

| | | | |
|---|---|---|---|
| 4,922,524 A | | 5/1990 | Baba et al. |
| 5,508,824 A | | 4/1996 | Baba |
| 5,727,050 A | * | 3/1998 | Mori et al. ............. 379/100.09 |
| 5,946,108 A | | 8/1999 | Baba |
| 6,266,159 B1 | * | 7/2001 | Otsuka et al. ......... 379/100.01 |

* cited by examiner

Primary Examiner—Wing F. Chan
(74) Attorney, Agent, or Firm—Cooper & Dunham LLP

(57) ABSTRACT

A data terminal is coupled to a local area network and a public switched telephone network. The controller performs a first operation each time an instruction is received for transmitting facsimile image information to a facsimile terminal connected to the public switched telephone network. The controller further performs a second operation each time a request with a specific password for browsing information is received from a different data terminal connected to the local area network. During the first operation, the controller requests a user entry of a password and links the password to the facsimile image information upon receiving a password. Further, the controller generates a communication history file including information associated with a transmission of the facsimile image information and the linked password, and stores the communication history file. During the second operation, the controller searches the specific communication history file by verifying a password included in each of the plurality of communication history files against the specific password. Further, the controller sends a specific communication history file to the different data terminal upon finding the specific communication history file which includes a password identical to the specific password sent from the different data terminal with the request.

24 Claims, 9 Drawing Sheets

METHOD AND APPARATUS CAPABLE OF PERFORMING INFORMATION PROVIDING OPERATION WITH INFORMATION SECURITY MEASURES

BACKGROUND

1. Field

The disclosed method and system relates to a network facsimile apparatus, and more particularly to a network facsimile apparatus which is capable of performing an information providing operation with information security measures.

2. Description of the Related Arts

There has been developed a so-called network facsimile machine that is capable of exchanging E-mail (electronic mail) with other data terminals via a local area network and the Internet, as well as exchanging facsimile data with other facsimile machines via a public switched telephone network (PSTN). Such a network facsimile machine is capable of transmitting image information to both users of data terminals such as PCs (personal computers) on the local area network and to facsimile machines connected to the public switched telephone network. Also, the network facsimile machine may transmit image information to data terminals connected to other local area networks when the local area network of the network facsimile machine is connected to other local area networks through the Internet.

Moreover, users can transmit image information from a facsimile machine to data terminals on a local area network via the network facsimile machine. The network facsimile machine can also relay information to other network facsimile machines across local area networks. Accordingly, users can benefit from such convenient connections between networks of the facsimile machines and the data terminals.

However, the above-described network facsimile apparatus raises a problem of confidentiality. That is, the above-described network facsimile apparatus is configured to maintain various kinds of communication history information of each workstation connected to the local area network that can be communicated with, for the purpose of conveniently providing such information to the users. Such communication history information typically includes a sender's name, transmission date and time, a destination of the transmission, the image information transmitted to the destination, and so forth. Under such a circumstance, users can easily read any piece of communication history information, even a piece of information belonging to another user, stored in the network facsimile apparatus on the workstations connected to the local area network. Thereby, the communication history information can be leaked through the network facsimile apparatus and the security of information in the local area network can be broken easily.

SUMMARY

The present application provides a data terminal that can be coupled to a local area network and a public switched telephone network. In one embodiment, the data terminal includes a first communications device, a second communications device, a memory, a data entry mechanism, and a controller. The first communications device transmits and receives electronic mail through the local area network. The second communications device transmits and receives facsimile image information through the public switched telephone network. The data entry mechanism allows alphanumeric data entry. The controller performs a first operation each time when receiving an instruction for transmitting facsimile image information to a facsimile terminal connected to the public switched telephone network through the second communications device. The controller further performs a second operation each time when receiving through the first communication device from a different data terminal connected to the local area network a request with a specific password for browsing information stored in the memory. During the first operation, the controller requests a user entry of a password through the data entry mechanism, links the password to the facsimile image information upon receiving the user entry of a password. Further, the controller generates a communication history file including information associated with a transmission of the facsimile image information and the password linked to the facsimile image information, and stores the communication history file into the memory. During the second operation, the controller searches the specific communication history file by verifying a password included in each of the plurality of communication history files stored in the memory against the specific password. Further, the controller sends a specific communication history file from the memory to the different data terminal through the first communication device upon finding in the memory the specific communication history file which includes a password identical to the specific password sent from the different data terminal with the request.

The password may represent an identification of a user who sends the request from the different data terminal to the data terminal.

The password may represent an identification of a facsimile terminal connected to the public switched telephone network and to which the facsimile image information is sent.

The information included in the communication history file may include transmission date and time, a transmission mode, a destination terminal number, a transmission result, and an image information file number.

During the first operation, the controller may request a user entry of a password through the data entry mechanism, and link the password to the facsimile image information upon receiving the user entry of a password. Further, the controller may generate an image profile file including information associated with the facsimile image information and the password linked to the facsimile image information, and store the image profile file and the facsimile image information into the memory. During the second operation, the controller may search the specific facsimile image information by verifying a password included in each of a plurality of image profile files stored in the memory against the specific password, and read a specific facsimile image information from the memory through the link between an image profile file and the specific facsimile image information upon finding in the memory the image profile file which includes a password identical to the specific password sent from the different data terminal with the request. Further, the controller may send the specific facsimile image information from the memory to the different data terminal through the first communication device.

The information included in the image profile file may include an image information file number, an image mode, and an image mapping information.

The second communication device may perform a facsimile transmission according to a Group 3 facsimile communications procedure.

The controller may exchange data with the different data terminal during the second operation in accordance with a point-to-point communications method.

The present application also provides an information providing method for a data terminal that can be coupled to a local area network and a public telephone network. In one embodiment, an information providing method includes the steps of receiving, requesting, linking, generating, storing, receiving, researching, and sending. The receiving step receives an instruction for transmitting facsimile image information to a facsimile terminal connected to the public switched telephone network. The requesting step requests a user entry of a password. The linking step links the password to the facsimile image information upon receiving the user entry of a password. The generating step generates a communication history file including information associated with a transmission of the facsimile image information and the password linked to the facsimile image information. The storing step stores the communication history file into a memory. The receiving step receives from a different data terminal connected to the local area network a request with a specific password for browsing information stored in the memory. The researching step researches the specific communication history file by verifying a password included in each of the plurality of communication history files stored in the memory against the specific password. The sending step sends a specific communication history file from the memory to the different data terminal upon finding in the memory the specific communication history file which includes a password identical to the specific password sent from the different data terminal with the request.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein.

DETAILED DESCRIPTION

Figure 1:
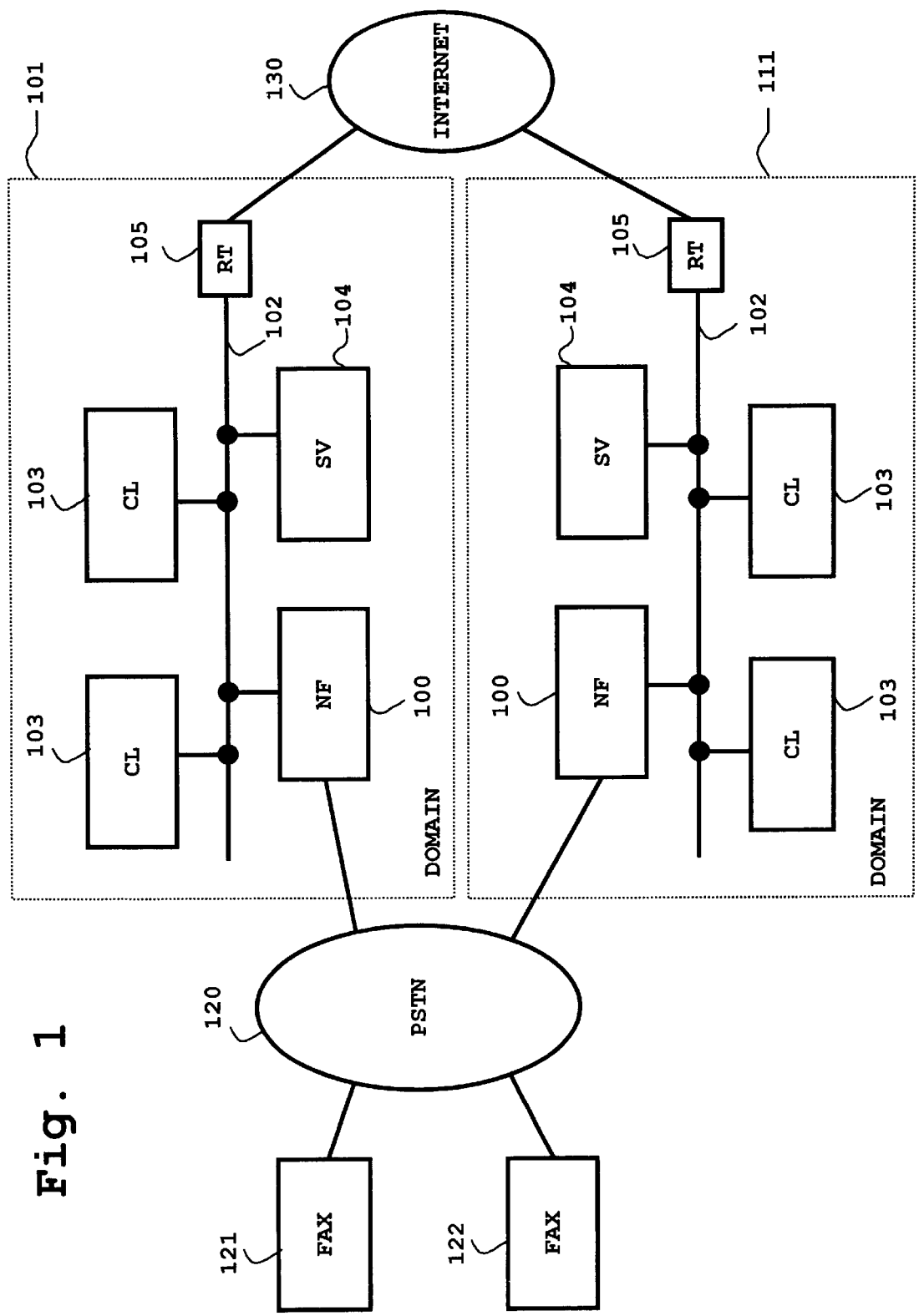
FIG. 1 is a block diagram of an electronic communications system including a network facsimile apparatus according to an embodiment of the present application.

In describing preferred embodiments illustrated in the drawings, specific terminology is employed for the sake of clarity.

However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including a network facsimile apparatus (NF) 100. The electronic communications system of FIG. 1 includes various types of electronic communications networks such as a domain (DM) 101, a domain (DM) 111, a public switched telephone network (PSTN) 120, the Internet 130, and possibly other networks which are not specifically illustrated.

The DM 101 includes a local area network (LAN) 102 that connects various devices, including the above-mentioned network facsimile apparatus 100, a plurality of client terminals (CL) 103, a mail server (SV) 104, and a router (RT) 105 and that allows communications between the various devices. The DM 111 has a similar configuration to that of the DM 101 for the sake of simplicity. The PSTN 120 connects a plurality of communications terminals including Group 3 facsimile machines (FAX) 121 and 122 to allow communications between these terminals. The Internet 130 connects a plurality of domains (DMs), including the DMs 101 and 111, and allows communications between the domains.

In each of the DMs 101 and 111, the network facsimile apparatus 100 is connected to the LAN 102 and the PSTN 120 to function as a gateway to both networks. The RT 105 is connected to the LAN 102 and the Internet 130 to function as another gateway to these networks. Through these connections, each of the LANs 102 has a connection to the plurality of communications terminals including the FAXs 121 and 122 through the PSTN 120 and to the plurality of domains through the Internet 130.

Preferably, each of the FAXs 121 and 122 transmits and receives image information through a Group 3 facsimile communications procedure.

Each of the DMs 101 and 111 has an individual domain identification. Each of the DMs 101 and 111, the network facsimile apparatus 100, each of the CLs 103, and the SV 104 is given an individual network address, usually based on its individual address information coupled with the corresponding domain identification. A user who uses a client terminal in the DM 101 is provided with an individual user address which is usually based on the user's individual name coupled with the above-mentioned individual network address of the client terminal. Such an individual user address that is generally made of alphanumeric symbols including alphabetical characters is referred to as an electronic mail (E-mail) address. Using these network addresses and E-mail addresses, communications are carried out between terminals including the CLs 103 and the network facsimile apparatus 100 within a domain and between domains through the Internet 130.

The network facsimile apparatus 100 has functions for sending and receiving electronic mail (E-mail) to and from other terminal machines through the LAN 102. Also, the network facsimile apparatus 100 has general facsimile functions including a Group 3 facsimile communications capability for transmitting and receiving facsimile image information to and from destination facsimile machines through the PSTN 120. Using these functions, the network facsimile apparatus 100 operates as an information server between the facsimile machines of the PSTN and the client terminals of the LAN 102.

Generally, a so-called protocol suite is applied for communications between machines connected to local area networks and via the Internet. In an operation of the protocol suite, a communication protocol, such as TCP/IP (transmission control protocol/Internet protocol) and another communication protocol are used in combination for up to a transport layer of an OSI (open systems interconnection), and for the layers higher than the transport layer, respectively. For example, an SMTP (simple mail transfer protocol) is used as a higher layer protocol for communications such as E-mail.

In each of the DMs 101 and 111, the LAN 102 employs a general mail server system in which an incoming E-mail is first stored in the SV 104 and then sent to a destination client terminal. More specifically, when E-mail information reaches a domain, for example DM 101, the file server 104 checks a destination mail address attached to the E-mail and if the destination mail address is for a client terminal of that domain the mail server system of the domain stores the E-mail into the SV 104. When the E-mail has a destination mail address other than one controlled by the domain, the mail server system of the domain transmits the E-mail to the Internet 130 via the RT 105, and the E-mail is sent to another domain, e.g. the DM 111, to seek the destination terminal machine, or to a host machine that has an address corresponding to the destination mail address attached to the E-mail, through a data transmission function of the Internet 130.

In the above-described server system, at a certain interval the network facsimile apparatus 100 and the CLs 103 in each domain, e.g., DMs 101 and 111, request the SV 104 to check if an incoming E-mail addressed for a user of the requesting machine is stored therein. If an E-mail addressed to the user of the requesting machine is stored in the SV 104, the mail server system transmits the E-mail to the requesting machine. Upon receiving the E-mail, the requesting machine indicates to the user that there is an incoming E-mail. In the example being described, the network facsimile apparatus 100 has an E-mail address to exchange E-mails as described above. The protocol is a POP (post office protocol), for example, to be applied for the communications from the CLs 103 and the network facsimile apparatus 100 to the SV 104 to request the incoming check as described above.

Each CL 103 has various application software programs including programs that are usually used by one or more users on an exclusive basis. These programs are provided for exchanging various kinds of data with other terminals through the LAN 102 and for executing various kinds of facsimile related operations. For example, a program generates facsimile image information and displays it on a screen.

Another program stored in each CL 103 converts binary data (e.g., facsimile information) into man-readable information (e.g., 7-bit data), using a predefined method (e.g., a Base 64 encoding method). This program is needed when the CL 103 sends E-mail with facsimile information since E-mail is not allowed to contain facsimile information as binary data. The format of the E-mail contents including the thus-converted facsimile information is referred to as a MIME format (multi-purpose Internet mail extensions).

The above-mentioned communication protocols, such as the TCP/IP, SMTP, and POP, as well as the data format and structure of the E-mail, including the MIME, are defined in an RFC (request for comments) published by an IETF (Internet engineering task force). For example, the TCP and IP are defined in an RFC793, the SMTP in an RFC821, and the data format and structure of the E-mail in an RFC822, RFC1521, RFC1522, and RFC1468.

Figure 2:
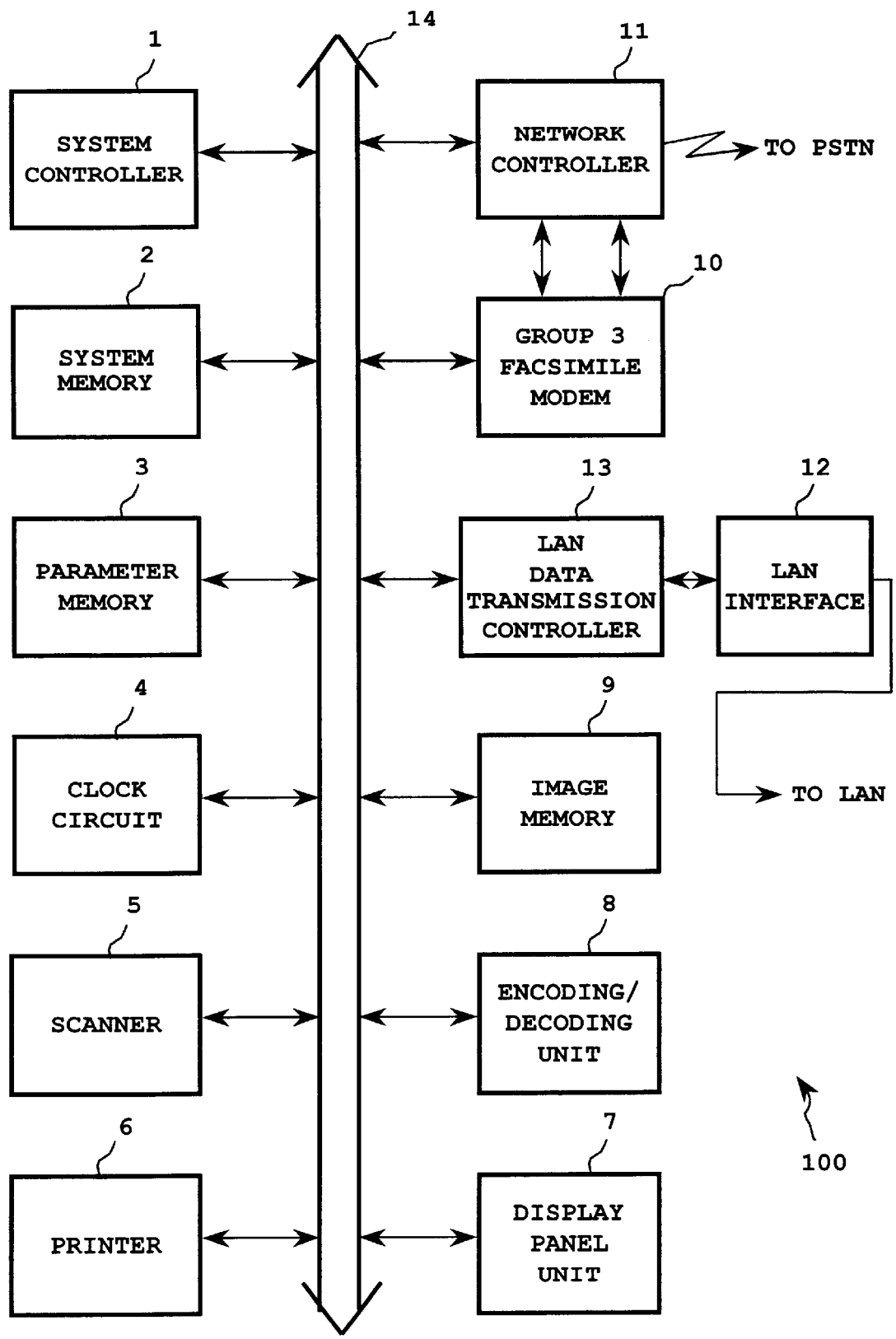
FIG. 2 is a block diagram of the network facsimile apparatus included in the electronic communications system of FIG. 1.

Next, an exemplary structure of the network facsimile apparatus 100 is explained with reference to FIG. 2. The network facsimile apparatus 100 includes a system controller 1, a system memory 2, a parameter memory 3, a clock circuit 4, a scanner 5, a printer 6, a display panel unit 7, an encoding/decoding unit 8, an image memory 9, a Group 3 facsimile modem 10, a network controller 11, a LAN (local area network) interface 12, a LAN (local area network) data transmission controller 13, and an internal bus 14.

The system controller 1 controls the operation of the network facsimile apparatus 100 including facsimile data transmission controls for transmitting and receiving image information and arbitrary data files. The system memory 2 stores control (or application) programs to be performed by the system controller 1 and various kinds of data necessary for the execution of the control programs. In addition, the system memory 2 includes a working memory area reserved for use of the system controller 1. The parameter memory 3 stores various kinds of parameters and information specific to the network facsimile apparatus 100. The clock circuit 4 generates information of the present time.

The scanner 5 reads an image of a document at a predetermined resolution. The printer 6 produces an image output at a predetermined resolution. The display panel unit 7 includes various kinds of operational keys and indicators interfacing between an operator and the network facsimile apparatus 100.

The encoding/decoding unit 8 encodes an input image signal to compress the image information and decodes the compressed image information back into the input image signal and the transmission data memory 9 stores data including the compressed image data and data files to be transmitted.

The Group 3 facsimile modem 10 is preferably a Group 3 facsimile modem that performs the functions of a modem for the Group 3 facsimile machine. The facsimile modem 10 includes a low-speed modem function, such as a V.21 modem, for transmitting and receiving communication protocols and a high-speed modem function, such as V.17, V.34, V.29, V.27ter modems, for mainly transmitting and receiving image information. The Group 3 facsimile modem 10 also includes a tone generating function for generating various different tones and a tone detecting function for detecting various different tones including a push-button-tone signal, for example. The network controller 11 has direct connections to the Group 3 facsimile modem 10. The network controller 11 includes an automatic transmitting and receiving function and controls the connection of the network facsimile apparatus 100 to the PSTN 120.

The LAN interface 12 is a communication interface between the LAN data transmission controller 13 and the LAN 102 located in the same domain as the network facsimile apparatus 100. The LAN data transmission controller 13 controls communications, using a predetermined protocol suite, for exchanging various kinds of data with other devices associated with the same domain as the network facsimile apparatus 100, e.g., DM 101, via the LAN 102. The controller 13 can also control communications for exchanging various kinds of data with data terminal machines associated with other domains via the Internet 130.

The internal bus 14 is connected to all of the above-described units of the network facsimile apparatus 100, except for the LAN interface 12 which has a connection to the LAN data transmission controller 13. The bus 14 provides a medium for communications between the various units of the network facsimile apparatus 100.

In this way, one of the preferred structures of the network facsimile apparatus 100 is arranged.

Figure 3A:
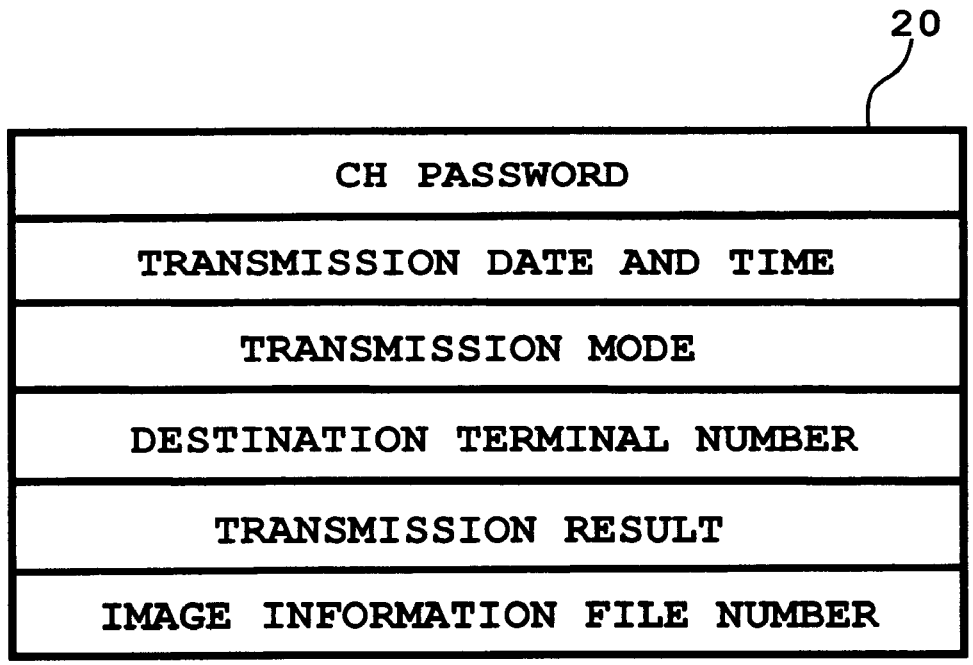
FIG. 3A is an illustration for explaining a communication history file generated by the network facsimile apparatus of FIG. 2.
Figure 3B:
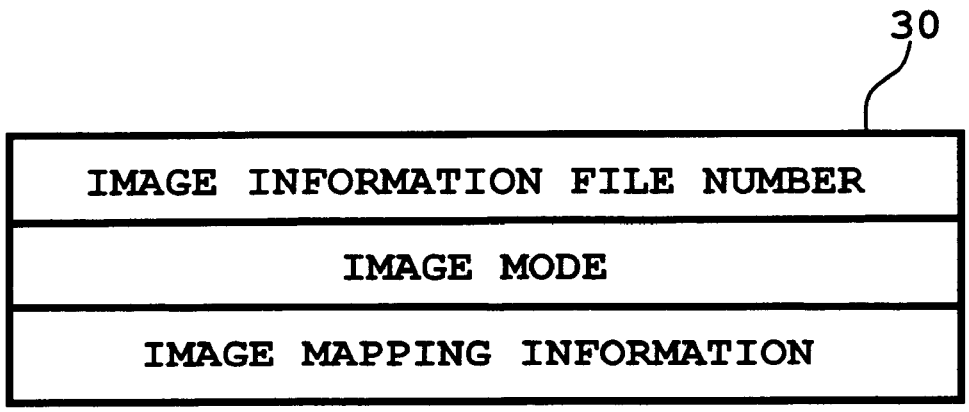
FIG. 3B is an illustration for explaining an image information file generated by the network facsimile apparatus of FIG. 2.

Referring to FIGS. 3A and 3B, a communication history file memory 20 and an image profile file memory 30 are explained below. The network facsimile apparatus 100 includes a communication history information file memory 20 in the system memory 2 and an image profile file memory 30 in the image memory 9.

The communication history file memory 20 includes a plurality of communication history files which can be identified with the respective unique passwords. This unique password, which is referred to as a communication history (CH) password, will be registered on the network facsimile apparatus 100 through each facsimile image transmission operation in a below-described way. Each communication history file includes a plurality of information sets related to communication sessions executed by a terminal (e.g., the CL 103) with other terminals.

More specifically, each information set includes a CH password, transmission date and time, a transmission mode, a destination terminal number, a transmission result, and an image information file number, as shown in FIG. 3A. The CH password is referred to by the network facsimile apparatus 100 when receiving an access to the communication history file memory 20 from a terminal (e.g., the CL 103). The image information file number represents a file number of the image information which is transmitted from the network facsimile apparatus 100 to the destination terminal during the corresponding communication session and which is stored in the image memory 9 of the network facsimile apparatus 100.

The image profile file memory 30 includes a plurality of image profile files. Each image profile file represents a profile of the image information which is contained in each image information file accumulatively saved in the image memory 9. More specifically, as shown in FIG. 3B, each image profile file includes an image information file number which identifies a specific image information file, an image mode (e.g., a resolution and an encoding method), and image mapping information that represents a manner in which the image information is stored.

Figure 4:
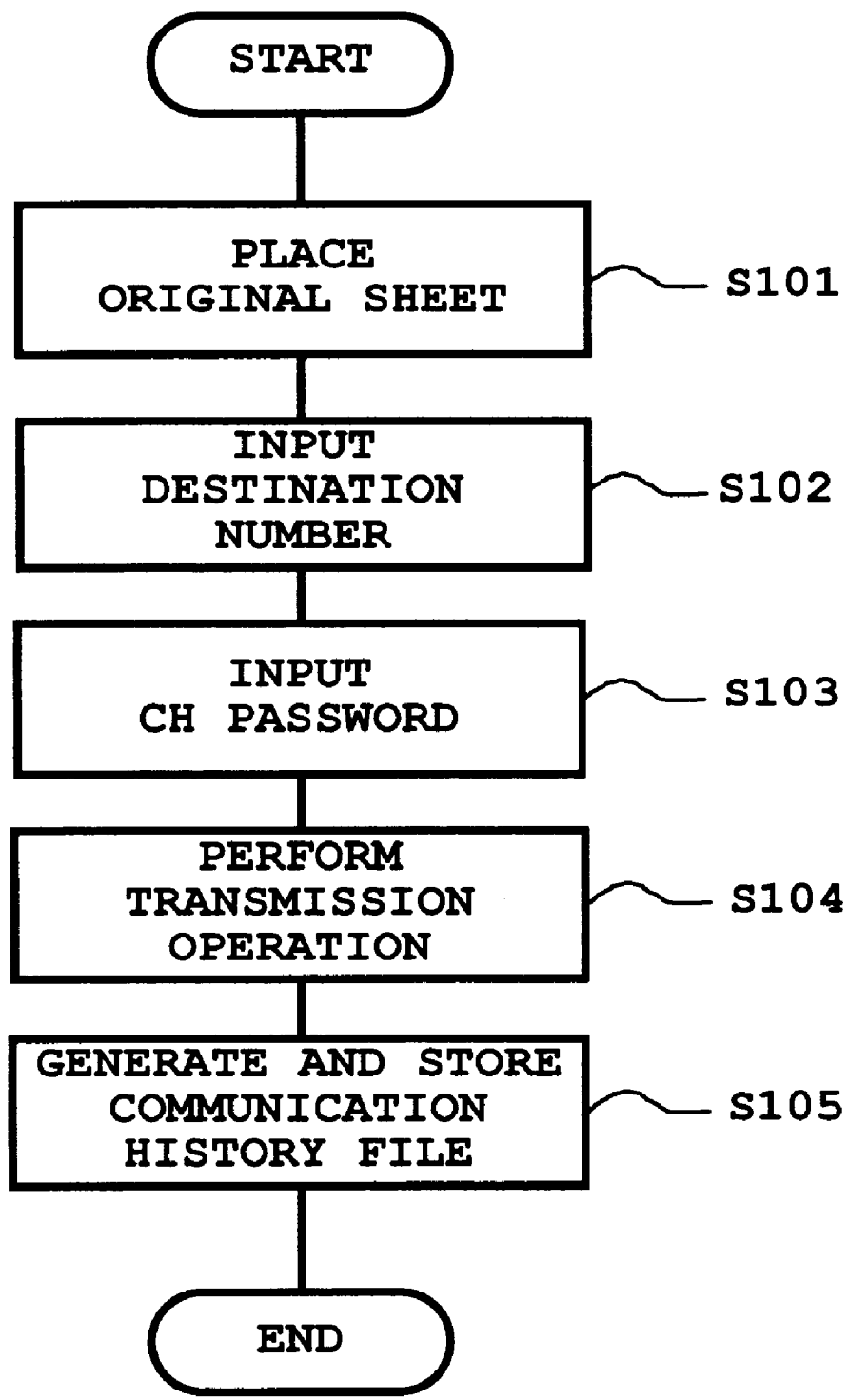
FIG. 4 is a flowchart explaining an exemplary procedure of a facsimile transmission operation performed by the network facsimile apparatus of FIG. 2, registering a communication history password.

Next, an exemplary way of ensuring the security of communication history files on the network facsimile apparatus 100 will be explained with reference to FIGS. 4 and 5. FIG. 4 shows an exemplary procedure of a facsimile image transmission operation performed on the network facsimile apparatus 100.

In Step S101 of FIG. 4, a user places an original sheet on the scanner 5 of the network facsimile apparatus 100. Then, to start a facsimile image transmission operation, the user inputs a destination number in Step S102 and subsequently a CH password in Step S103, through the display panel unit 7. The destination number specifies a terminal machine to which the image of the original sheet placed on the scanner 5 is transmitted. The CH password identifies the above communication session.

Upon the input of the CH password in Step S103, the network facsimile apparatus 100 starts a series of facsimile operations; reading the image of the original sheet, encoding the image data with the encoding/decoding unit 8, storing the encoded image information into the image memory 9, sending a call to a destination terminal using the designated destination number, and transmitting the image information from the image memory 9 according to the Group 3 facsimile transmission procedure. During the above operations, particularly when the encoded image data is stored into the image memory 9, the network facsimile apparatus 100 generates an image profile file relative to the image information to be transmitted and stores it in the image profile file memory 30.

Upon completing the above facsimile operations, the network facsimile apparatus 100 generates a communication history file of the executed facsimile operation and stores it in the communication history information file memory 20, in Step S105. Then, the process of the facsimile image transmission operation ends.

Figure 5:
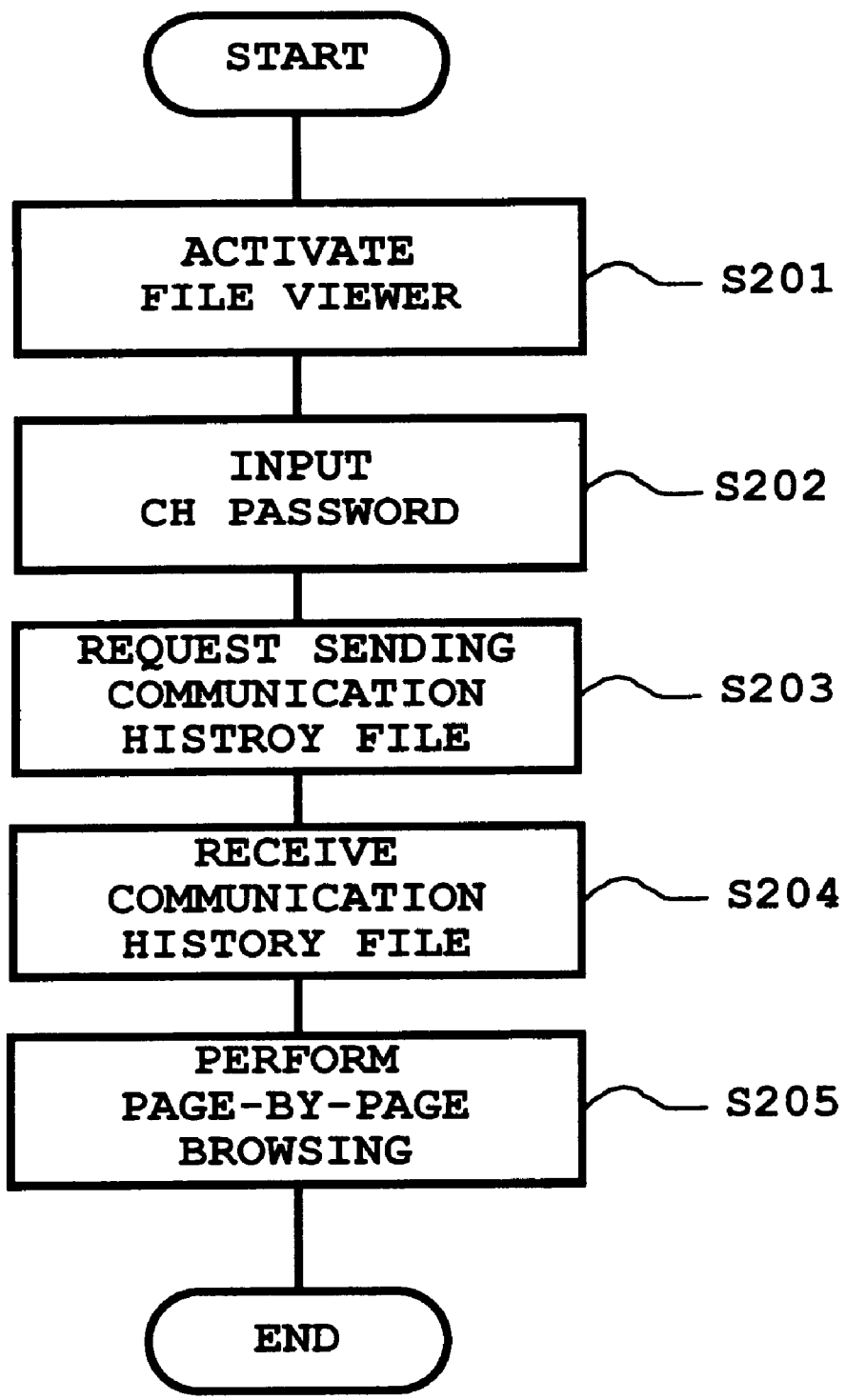
FIG. 5 is a flowchart explaining an exemplary procedure of a communication history file reading operation performed by the network facsimile apparatus of FIG. 2, specifying the communication history password.

FIG. 5 shows an exemplary procedure of a communication history reading operation (an information providing operation by the network facsimile apparatus 100) by the client terminal (e.g., the CL 103). In this example, the CL 103 has an application software program (referred to as a file viewer) for performing page-by-page browsing through an information file (e.g., the communication history file) stored in the network facsimile apparatus 100 through the LAN 102. In Step S201 of FIG. 5, the file viewer is activated on the CL 103. In Step S202, the user inputs a CH password on the CL 103.

Upon the input of the CH password, the CL 103 sends to the network facsimile apparatus 100 a request for browsing the communication history file relative to that CH password, in Step S203. Subsequently, upon receiving the request, the network facsimile apparatus 100 searches in the communication history file memory 20 of the system memory 2 for a communication history file corresponding to the CH password sent from the CL 103 and sends it to the CL 103 under a predetermined point-to-point communication protocol, for example.

In Step S204, the CL 103 receives the corresponding communication history file from the network facsimile apparatus 100. Then, in Step S205, the CL 103 performs the page-by-page browsing through the communication history file on a display (not shown) thereof so that the user can see on the CL 103 the history of the communications sessions which the user has executed on the network facsimile apparatus 100 using the specific CH password. Then, the process of the communication history reading operation ends.

In this way, with the CH password, the user can access only the communication history file related to that user and is not allowed to access any other communication history files. Thereby, the network facsimile apparatus 100 can provide security of the communication history information.

Figure 6:
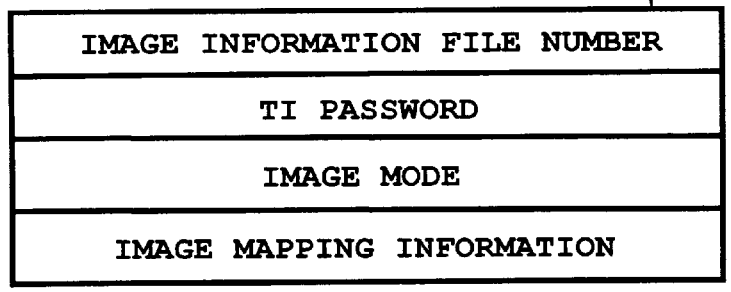
FIG. 6 is an illustration for explaining a modified image information file including a transmittal image information password input on the network facsimile apparatus of FIG. 2.

Next, an exemplary way of ensuring the security of image information files on the network facsimile apparatus 100 is explained with reference to FIGS. 6–8. The network facsimile apparatus 100 includes a modified image profile file memory 31 in place of the image profile file memory 30 of FIG. 3B. The modified image profile file memory 31 is similar to the image profile file memory 30 of FIG. 3B, except for a transmittal image information (TI) password as shown in FIG. 6.

Figure 7:
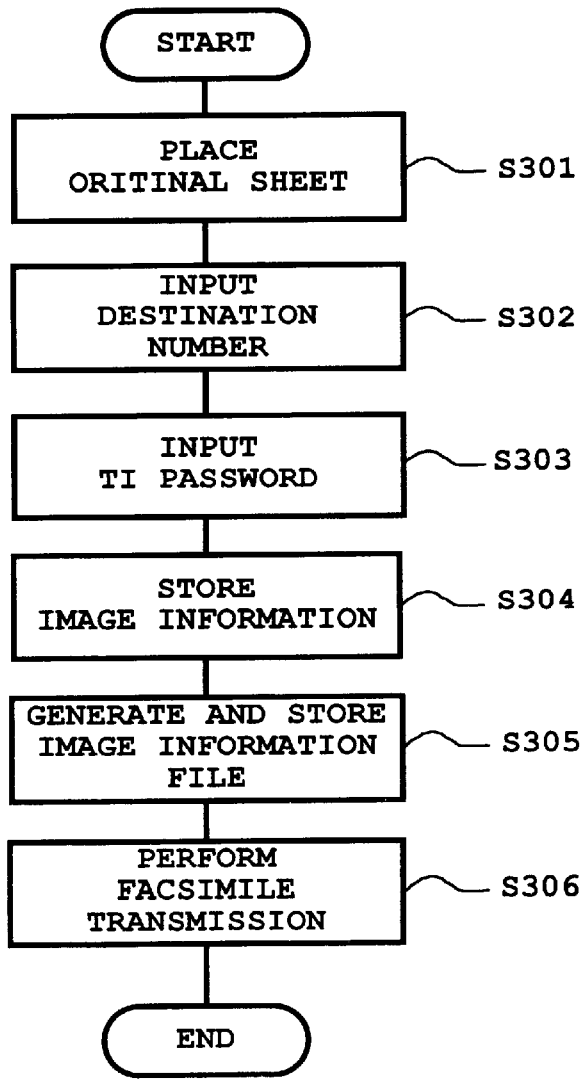
FIG. 7 is a flowchart explaining an exemplary procedure of a facsimile transmission operation performed on the network facsimile apparatus of FIG. 2, registering the transmittal image information password.

FIG. 7 shows an exemplary procedure of a facsimile image transmission operation performed on the network facsimile apparatus 100. In Step S301 of FIG. 7, a user places an original sheet on the scanner 5 of the network facsimile apparatus 100. Then, to start a facsimile image transmission operation, the user inputs a destination number in Step S302 and subsequently a TI password in Step S303, through the display panel unit 7. The destination number specifies a terminal machine to which the image of the original sheet placed on the scanner 5 is transmitted. The TI password identifies the image information to be sent to the destination terminal during the above communication session.

Upon the input of the TI password in Step S303, the network facsimile apparatus 100 reads the image of the original sheet and encodes the image data with the encoding/decoding unit 8. After that, the network facsimile apparatus 100 stores the encoded image information into the image memory 9, in Step S304. Subsequently, the network facsimile apparatus 100 generates an image profile file relative to the image information to be transferred with the TI password in the image profile file memory 31, in Step S305. Then, in Step S306, the network facsimile apparatus 100 sends a call to a destination terminal using the designated destination number and transmits the image information from the image memory 9 according to the Group 3 facsimile transmission procedure. Then, the process of the facsimile image transmission operation ends.

Figure 8:
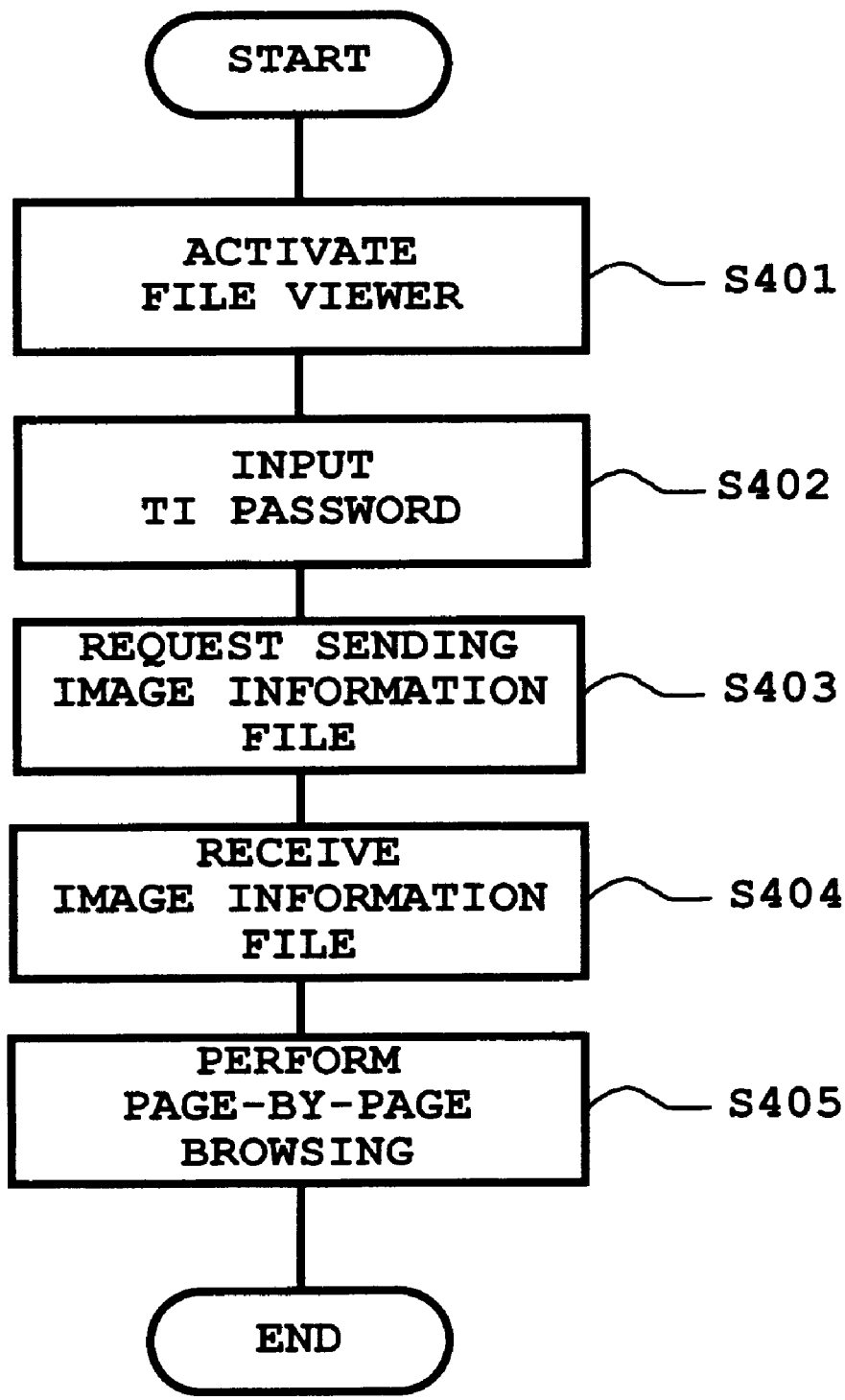
FIG. 8 is a flowchart explaining an exemplary procedure of an image information file reading operation performed on the network facsimile apparatus of FIG. 2, specifying the transmittal image information password.

FIG. 8 shows an exemplary procedure of an image information file reading operation (an information providing operation by the network facsimile apparatus 100) by the client terminal (e.g., the CL 103). In this example, the CL 103 has an application software program (referred to as a file viewer) for performing page-by-page browsing through an information file (e.g., the image information file) stored in the network facsimile apparatus 100 through the LAN 102.

In Step S401 of FIG. 8, the file viewer is activated on the CL 103. In Step S402, the user inputs a TI password on the CL 103. Upon the input of the TI password, the CL 103 sends to the network facsimile apparatus 100 a request for browsing the image information file relative to that TI password, in Step S403. Upon receiving the request, the network facsimile apparatus 100 searches through the image profile files in the image profile file memory 31 of the image memory 9 for an image information file corresponding to the TI password sent from the CL 103 and, upon finding it, sends the corresponding image information file to the CL 103 under a predetermined point-to-point communication protocol, for example.

In Step S404, the CL 103 receives the corresponding image information file from the network facsimile apparatus 100. Then, in Step S405, the CL 103 performs the page-by-page browsing through the image information file on a display (not shown) thereof so that the user can see on the CL 103 the image of the communications sessions which the user has executed on the network facsimile apparatus 100 using the specific TI password. Then, the process of the image information file reading operation ends.

In this way, with the TI password, the user can access only the image information file related to that user and is not allowed to access any other image information files. Thereby, the network facsimile apparatus 100 can provide security of the transmittal image information.

Figure 9:
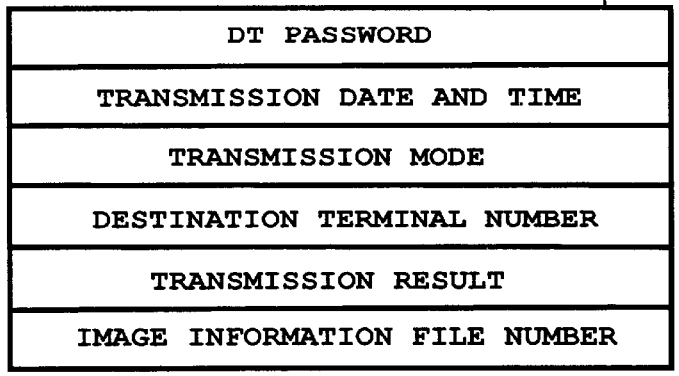
FIG. 9 is an illustration for explaining a modified communication history file including a destination terminal information password input on the network facsimile apparatus of FIG. 2.

Next, another exemplary way of ensuring the security of image information files on the network facsimile apparatus 100 is explained with reference to FIGS. 9–11. This example relates to a function of the network facsimile apparatus 100 for transmitting the stored image information to a destination terminal specified by a client terminal (e.g., the CL 103). The network facsimile apparatus 100 includes a modified communication history file memory 21 in place of the communication history file memory 20 of FIG. 3A. The modified communication history file memory 21 is similar to the communication history file memory 20 of FIG. 3A, except for a destination terminal (DT) password in place of the communication history (CH) password, as shown in FIG. 9.

Figure 10:
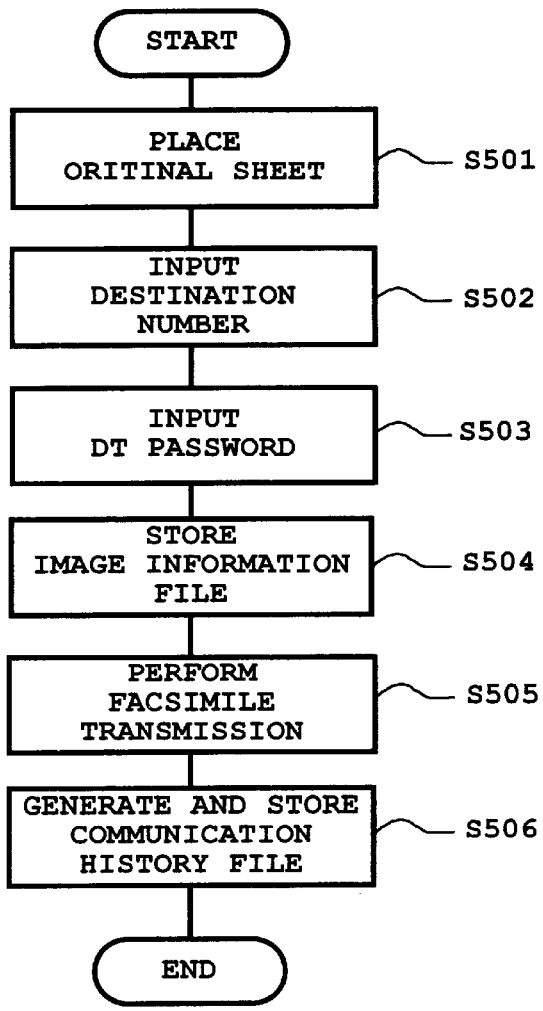
FIG. 10 is a flowchart explaining an exemplary procedure of a facsimile transmission operation performed on the network facsimile apparatus of FIG. 2, registering a destination terminal information password.

FIG. 10 shows an exemplary procedure of a facsimile image transmission operation performed on the network facsimile apparatus 100. In Step S501 of FIG. 10, a user places an original sheet on the scanner 5 of the network facsimile apparatus 100. Then, to start a facsimile image transmission operation, the user inputs a destination number in Step S502 and subsequently a DT password in Step S503, through the display panel unit 7. The destination number specifies a terminal machine to which the image of the original sheet placed on the scanner 5 is transmitted. The DT password is uniquely linked to the destination number, which is known only by the user.

Upon the input of the DT password in Step S503, the network facsimile apparatus 100 reads the image of the original sheet and encodes the image data with the encoding/decoding unit 8. After that, the network facsimile apparatus 100 stores the encoded image information into the image memory 9, in Step S504. At this time, the network facsimile apparatus 100 also generates and saves an image profile file similar to those stored in the image profile file memory 30 shown in FIG. 3B.

Upon completing saving the image information in the image memory 9, the network facsimile apparatus 100 sends in Step S505 a call to a destination terminal using the designated destination number and transmits the image information from the image memory 9 according to the Group 3 facsimile transmission procedure. Then, in Step S506, the network facsimile apparatus 100 generates a communication history file including the DT password and saves it into the modified communication history memory 21. Then, the process of the facsimile image transmission operation ends.

Figure 11:
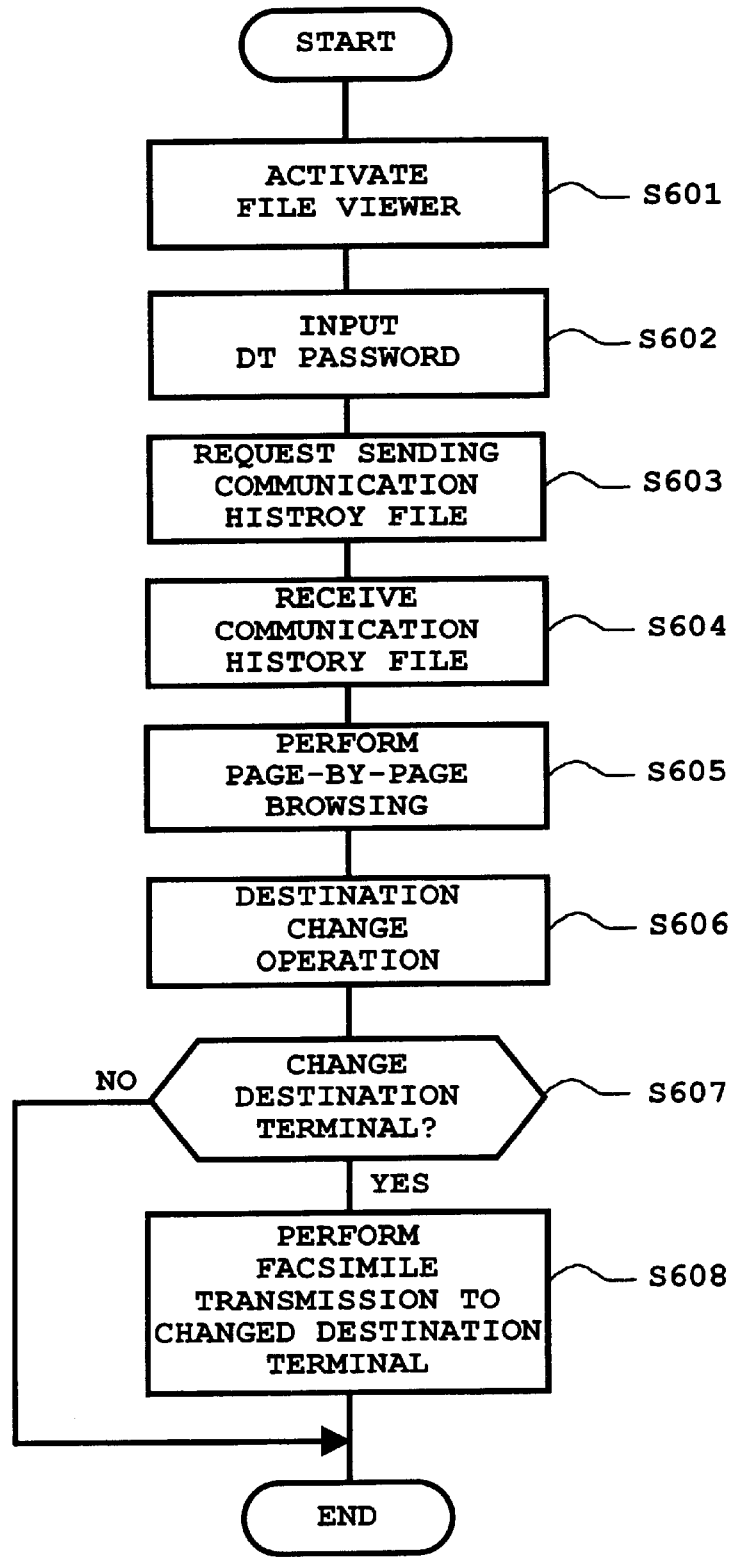
FIG. 11 is a flowchart explaining an exemplary procedure of an image information transferring operation performed on the client terminal connected to the network facsimile apparatus of FIG. 2, specifying the destination terminal information password.

FIG. 11 shows an exemplary procedure of an image information file transferring operation performed on the network facsimile apparatus 100 by an instruction (through an information providing operation by the network facsimile apparatus 100) from the client terminal (e.g., the CL 103). In this example, the CL 103 has an application software program (referred to as a facsimile viewer) for performing page-by-page browsing through an information file (e.g., the communication history file) stored in the network facsimile apparatus 100 through the LAN 102.

In Step S601 of FIG. 11, the facsimile viewer is activated on the CL 103. In Step S602, the user inputs a DT password on the CL 103. Upon the input of the DT password, the CL 103 sends to the network facsimile apparatus 100 a request for browsing the communication history file relative to that DT password, in Step S603. Upon receiving the request, the network facsimile apparatus 100 searches the communication history file memory 21 of the system memory 2 for a communication history file corresponding to the DT password sent from the CL 103 and sends it to the CL 103 under a predetermined point-to-point communication protocol, for example.

In Step S604, the CL 103 receives the corresponding communication history file from the network facsimile apparatus 100. Then, in Step S605, the CL 103 performs page-by-page browsing through the communication history file on a display (not shown) thereof. Thereby, the user can see on the CL 103 the history of the communications sessions which the user has executed on the network facsimile apparatus 100 relative to the destination terminal using the DT password.

Then, in Step S606, the CL 103 performs a destination change operation. In the destination change operation, the facsimile viewer requests the user through the display to determine whether to send the image information recorded in the communication history to a destination terminal other than that recorded. If the user desires to send the image information to a different destination terminal and the result of Step S607 is YES, the CL 103 sends to the network facsimile apparatus 100 a request for transferring the image information recorded in the communication history to a changed destination number in Step S608. If the result of Step S607 is NO, the process of the image information file reading operation ends.

In this way, with the DT password, the user can access and transfer only the image information which has been transmitted by that user to a different destination terminal and is not allowed to access and transfer any other image information files. Thereby, the network facsimile apparatus 100 can provide security of the transmittal image information.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

This application claims the priority rights of and is based on the subject matter of Japanese Patent Application No. JPAP10-204605 filed Jul. 21, 1998, the entire contents of which are herein incorporated by reference.

What we claim is:

1. A data terminal which is coupled to a local area network and a public switched telephone network, comprising:
a first communications device that transmits and receives electronic mail through said local area network;
a second communications device that transmits and receives facsimile image information through said public switched telephone network;
a memory;
a data entry mechanism that allows alphanumeric data entry; and
a controller that performs a first operation each time an instruction is received for transmitting facsimile image information to a facsimile terminal connected to said public switched telephone network through said second communications device and a second operation each time said first communication device receives from a different data terminal connected to said local area network a request with a specific password for browsing information stored in said memory,
wherein said first operation requests a user entry of a password through said data entry mechanism, links said password to said facsimile image information upon receiving said user entry of a password, generates a communication history file including information associated with a transmission of said facsimile image information and said password linked to said facsimile image information, and stores said communication history file into said memory, and
said second operation searches said specific communication history file by verifying a password included in each of said plurality of communication history files stored in said memory against said specific password, and sends a specific communication history file from said memory to said different data terminal through said first communication device upon finding in said memory said specific communication history file which corresponds with a password identical to said specific password sent from said different data terminal with said request.

2. A data terminal as defined in claim 1, wherein said password represents an identification of a user who sends said request from said different data terminal to said data terminal.

3. A data terminal as defined in claim 1, wherein said password represents an identification of a facsimile terminal connected to said public switched telephone network and to which said facsimile image information is sent.

4. A data terminal as defined in claim 1, wherein said information included in said communication history file includes transmission date and time, a transmission mode, a destination terminal number, a transmission result, and an image information file number.

5. A data terminal as defined in claim 1, wherein said first operation requests a user entry of a password through said data entry mechanism, links said password to said facsimile image information upon receiving said user entry of a password, generates an image profile file including information associated with said facsimile image information and said password linked to said facsimile image information, and stores said image profile file and said facsimile image information into said memory, and
said second operation searches said specific facsimile image information by verifying a password included in each of a plurality of image profile files stored in said memory against said specific password, reads a specific facsimile image information from said memory through the link between an image profile file and said specific facsimile image information upon finding in said memory said image profile file which includes a password identical to said specific password sent from said different data terminal with said request, and sends said specific facsimile image information from said memory to said different data terminal through said first communication device.

6. A data terminal as defined in claim 5, wherein said information included in said image profile file includes an image information file number, an image mode, and an image mapping information.

7. A data terminal as defined in claim 1, wherein said second communication device performs a facsimile transmission according to a Group 3 facsimile communications procedure.

8. A data terminal as defined in claim 1, wherein said controller exchanges data with said different data terminal during said second operation in accordance with a point-to-point communications method.

9. A data terminal which is coupled to a local area network and a public switched telephone network, comprising:

first communications means for transmitting and receiving electronic mail through said local area network;

second communications means for transmitting and receiving facsimile image information through said public switched telephone network;

memory means;

data entry means for allowing alphanumeric data entry; and controller means for performing a first operation each time an instruction is received for transmitting facsimile image information to a facsimile terminal connected to said public switched telephone network through said second communications means and a second operation each time said first communication means receives from a different data terminal connected to said local area network a request with a specific password for browsing information stored in said memory means, wherein said first operation requests a user entry of a password through said data entry means, links said password to said facsimile image information upon receiving said user entry of a password, generates a communication history file including information associated with a transmission of said facsimile image information and said password linked to said facsimile image information, and stores said communication history file into said memory means, and said second operation searches said specific communication history file by verifying a password included in each of said plurality of communication history files stored in said memory means against said specific password, and sends a specific communication history file from said memory to said different data terminal through said first communication means upon finding in said memory means said specific communication history file which corresponds with a password identical to said specific password sent from said different data terminal with said request.

10. A data terminal as defined in claim 9, wherein said password represents an identification of a user who sends said request from said different data terminal to said data terminal.

11. A data terminal as defined in claim 9, wherein said password represents an identification of a facsimile terminal connected to said public switched telephone network and to which said facsimile image information is sent.

12. A data terminal as defined in claim 9, wherein said information included in said communication history file includes transmission date and time, a transmission mode, a destination terminal number, a transmission result, and an image information file number.

13. A data terminal as defined in claim 9, wherein said first operation requests a user entry of a password through said data entry means, links said password to said facsimile image information upon receiving said user entry of a password, generates an image profile file including information associated with said facsimile image information and said password linked to said facsimile image information, and stores said image profile file and said facsimile image information into said memory means, and said second operation searches said specific facsimile image information by verifying a password included in each of a plurality of image profile files stored in said memory means against said specific password, reads a specific facsimile image information from said memory means through the link between an image profile file and said specific facsimile image information upon finding in said memory means said image profile file which includes a password identical to said specific password sent from said different data terminal with said request, and sends said specific facsimile image information from said memory means to said different data terminal through said first communication means.

14. A data terminal as defined in claim 13, wherein said information included in said image profile file includes an image information file number, an image mode, and an image mapping information.

15. A data terminal as defined in claim 9, wherein said second communication means performs a facsimile transmission according to a Group 3 facsimile communications procedure.

16. A data terminal as defined in claim 9, wherein said controller means exchanges data with said different data terminal during said second operation in accordance with a point-to-point communications method.

17. An information providing method for a data terminal which is coupled to a local area network and a public switched telephone network, comprising the steps of:

receiving an instruction for transmitting facsimile image information to a facsimile terminal connected to said public switched telephone network;

requesting a user entry of a password;

linking said password to said facsimile image information upon receiving said user entry of a password;

generating a communication history file including information associated with a transmission of said facsimile image information and said password linked to said facsimile image information;

storing said communication history file into a memory;

receiving from a different data terminal connected to said local area network a request with a specific password for browsing information stored in said memory;

researching said specific communication history file by verifying a password included in each of said plurality of communication history files stored in said memory against said specific password; and sending a specific communication history file from said memory to said different data terminal upon finding in said memory said specific communication history file which includes a password identical to said specific password sent from said different data terminal with said request.

18. An information providing method as defined in claim 17, wherein said password represents an identification of a user who sends said request from said different data terminal to said data terminal.

19. An information providing method as defined in claim 17, wherein said password represents an identification of a facsimile terminal connected to said public switched telephone network and to which said facsimile image information is sent.

20. An information providing method as defined in claim 17, wherein said information included in said communication history file includes transmission date and time, a transmission mode, a destination terminal number, a transmission result, and an image information file number.

21. An information providing method as defined in claim 17, wherein:

said generating step generates an image profile file including information associated with said facsimile image information and said password linked to said facsimile image information;

said storing step stores said image profile file and said facsimile image information into said memory; and said searching step searches said specific facsimile image information by verifying a password included in each of a plurality of image profile files stored in said memory against said specific password, and further including a reading step for reading a specific facsimile image information from said memory through the link between an image profile file and said specific facsimile image information upon finding in said memory said image profile file which includes a password identical to said specific password sent from said different data terminal with said request, and wherein said sending step sends said specific facsimile image information from said memory to said different data terminal.

22. An information providing method as defined in claim 21, wherein said information included in said image profile file includes an image information file number, an image mode, and an image mapping information.

23. An information providing method as defined in claim 17, wherein said data terminal transmits said facsimile image information to said facsimile terminal connected to said public switched telephone network through a facsimile transmission according to a Group 3 facsimile communications procedure.

24. An information providing method as defined in claim 17, wherein said receiving step from and said sending step to said different data terminal conform to a point-to-point communications method.

* * * * *